Jan. 1, 1952 R. E. MOE 2,581,199

SAWTOOTH WAVE GENERATOR

Filed Sept. 4, 1948 2 SHEETS—SHEET 1

Inventor:
Robert E. Moe,
by Merton D. Moore
His Attorney.

Jan. 1, 1952

R. E. MOE 2,581,199

SAWTOOTH WAVE GENERATOR

Filed Sept. 4, 1948

2 SHEETS—SHEET 2

Inventor:
Robert E. Moe,
by Merton D. Moore
His Attorney

Patented Jan. 1, 1952

2,581,199

UNITED STATES PATENT OFFICE 2,581,199

SAWTOOTH WAVE GENERATOR

Robert E. Moe, Syracuse, N. Y., assignor to General Electric Company, a corporation of New York Application September 4, 1948, Serial No. 47,827

3 Claims. (Cl. 250—36)

This invention relates to non-sinusoidal voltage generators generally, and more particularly to generators of alternating currents and voltages of sawtooth and related wave forms. A sawtooth wave is one in which the voltage increases substantially linearly with time during a major portion of a cycle and decreases a like amount during the remainder of the cycle. The invention further relates to circuits for controlling the amplitude and repetition rate of such voltage and current wave forms generators.

In measuring circuits and in cathode ray oscilloscopes, it is often necessary to obtain a sawtooth voltage, the repetition rate of which can be readily controlled from an external source and the amplitude of which can be maintained constant. Maintaining constant the amplitude of a sawtooth wave, when its repetition rate is varied, implies increasing the rate of rise of the sloping portion of the wave in accordance with its repetition rate. It is possible, by the use of a relaxation oscillator, to generate a sawtooth wave of constant amplitude and variable repetition rate by changing the magnitude of a charging capacitance in the circuit, as is well known in the art. However, when the operation of the relexation oscillator is synchronized by a triggering voltage from some external source so as to vary the repetition rate in accordance therewith, the circuits known in the art do not provide any means for maintaining the amplitude of the wave constant. My invention provides a means for keeping the amplitude constant, under such circumstances, over wide variations of repetition rate.

An object of this invention is to provide an improved sawtooth wave generator wherein the repetition rate will correspond to that of a reference wave and wherein the amplitude will be kept constant.

Another object of this invention is to provide on improved circuit for controlling the average rate of rise of a sawtooth voltage in accordance with its average repetition rate.

Still another object of this invention is to provide an improved sweep generator wherein the amplitude of the sweep voltage is kept constant over a wide range of repetition rates.

For additional objects and for a better understanding of the invention, attention is now directed to the following description and accompanying drawings and also to the appended claims in which the features of the invention believed to be novel are particularly pointed out.

Figure 1:
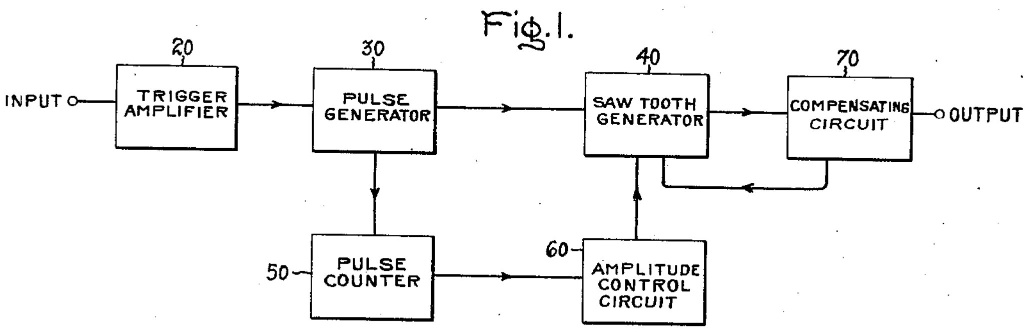
Figure 2:
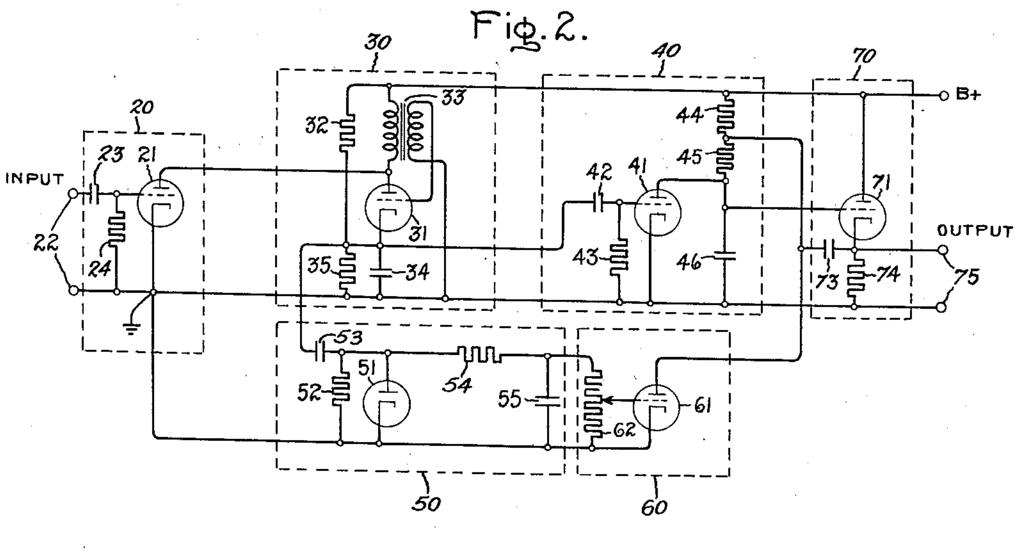
Figure 3:
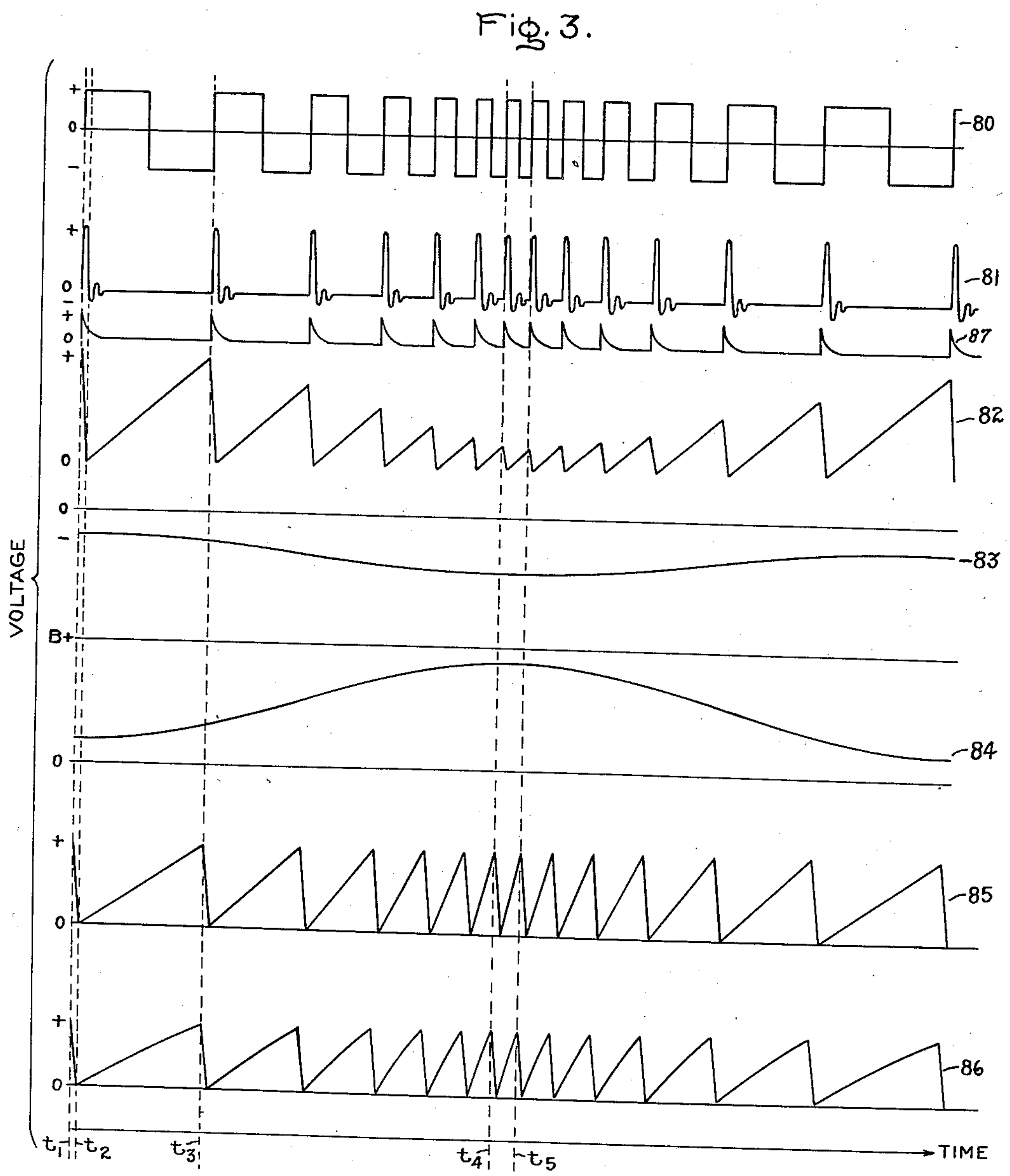

In the accompanying drawings, Fig. 1 indicates, in simplified block form, a complete system for generating a sawtooth wave in accordance with the invention; Fig. 2 illustrates graphically the circuit details of the generating system of Fig. 1; and Fig. 3 shows a series of curves on a common time scale graphically illustrating different voltage wave forms appearing in different parts of the generator over a number of complete periods of the sawtooth voltage and over a gradual change in the repetition rate.

Referring to the drawings, Fig. 1 shows a trigger amplifier 20 having an input to which an alternating voltage is supplied. The purpose of the trigger amplifier is to amplify and shape the input voltage and to supply it to a pulse generator 30. The pulse generator 30 supplies a positive pulse of short duration, relative to the period of the input voltage, to a sawtooth wave generator 40 and to a pulse counter 50. As will be more fully explained below in connection with Fig. 2, the sawtooth generator comprises a capacitance provided with a charging and a discharging circuit. The action of the discharging circuit is initiated by the pulses from the pulse generator 30. The pulse counter 50 produces a bias voltage, the amplitude of which is proportional to the repetition rate of the pulses received from the pulse generator 30. This bias is applied to an amplitude control circuit 60 which is connected to the charging circuit of the sawtooth generator so as to determine the rate of charge of a capacitance comprised therein. The charging of the sawtooth generator is thus initiated by pulses from the pulse generator and its rate of charge is controlled by the repetition rate of the pulses. A compensating circuit 70 is also included in the circuit to maintain a linear charging rate without requiring too high an operating potential for the circuit.

Referring to Fig. 2, the schematic circuit therein illustrates an embodiment of this invention to perform the functions required for the block diagram of Fig. 1. The circuit elements therein have been arranged in groups to perform the same functions as the blocks of Fig. 1. The trigger amplifier comprises a triode valve 21 having an input circuit comprising a coupling capacitor 23, a grid leak resistor 24, and input terminals 22. The anode of valve 21 is connected directly to the anode of valve 31 of the pulse generator which is connected in a blocking oscillator circuit. A transformer 33 applies the operating potential indicated by B+ to the anode of valve 31 and provides feedback to its control grid. A resistance combination comprising resistors 32 and 35 provides a suitable operating potential to the cathode of valve 31 and a capacitor 34 is placed in parallel with resistor 35 to provide some lengthening of the output pulse.

The voltage supplied at the input terminals of the trigger amplifier may be any type of recurrent wave and is not limited to simple waveforms. For purposes of illustration only, I have shown in Fig. 3 a square wave 80 as the input voltage, having a fundamental frequency which varies from a minimum at the time $t_1$ to a maximum at the time $t_4$, with a frequency variation of approximately 3 to 1 during this interval.

The trigger amplifier 20 applies a wave to the anode of valve 31 of the pulse generator 30, which is identical in shape to square wave 80, except that it is reversed in polarity. Due to the positive potential supplied to the cathode of valve 31 by the voltage dropping combination of resistors 32 and 35, valve 31 is normally cut off and has a high positive potential on its anode. When the leading edge of a negative pulse is applied to the anode, a voltage is induced in the grid circuit through transformer action which overcomes the negative bias and permits the valve to start conducting, and an oscillation then builds up rapidly to a positive peak, as illustrated by curve 81 of Fig. 3. However, because of the proportions of the circuit elements, the oscillations are rapidly damped after the first half cycle, so that the useful output at the cathode is a series of positive pulses as illustrated by curve 87 of Fig. 3. The amplitude and time duration of each of these pulses is independent of the input voltage represented by curve 80, and is a function solely of the circuit constants of the pulse generator. The input voltage through the trigger amplifier controls only the time of occurrence of the pulses.

The output of the pulse generator 30 is supplied to the input circuit of a triode valve 41 of the sawtooth generator 40. A capacitor 42 and a resistor 43 provides a circuit for normally biasing the control grid of valve 41 to a value below cut off. A capacitor 46 in series with two resistors 45 and 44, connected across the source of operating potential indicated by B+, constitutes a charging circuit. Through its operation, capacitor 46 charges substantially linearly with time, and the ascending portion of a sawtooth wave is thus generated across its terminals. When a positive pulse is applied to the grid of valve 41 through capacitor 42, the valve becomes fully conducting and discharges whatever charge may have accumulated in capacitor 46 since the previous occurrence of discharge. During the intervals between pulses, the grid of valve 41 is biased below cut off by reason of the charging of capacitor 42 through grid current flow during the previous positive pulse.

In the circuit as thus far described, leaving out of account the pulse counter 50 and the amplitude control circuit 60, the output voltage available across capacitor 46 would be as represented by curve 82 of Fig. 3. This curve illustrates a sawtooth wave in which the rate of rise of the ascending portions of the wave are constant. The instant of initiation of a cycle of the wave is controlled by the occurrence of the pulses of curve 87. Since, under the present circumstances, the rate of rise is constant, when the repetition rate of the pulses increases, the amplitude, to which the ascending portion of the sawtooth rises, is decreased. Accordingly, the output is constituted by a series of similar sawtooth or triangular waves whose amplitudes are directly proportional to their respective period or time duration. As previously stated, an object of this invention is to maintain the amplitude of the sawtooth wave constant in spite of variations in repetition rate and this is accomplished by the remaining circuits now to be described.

The pulse counter 50 comprises a diode valve 51, whose anode is connected to the cathode of the valve 31 by means of a capacitor 53, a resistor 52 connected between the anode and ground, and a filter comprising a resistor 54 and a capacitor 55. When a positive pulse, such as those represented by curve 87, is applied to the circuit, current flows through the diode 51 and charges capacitor 53 to a potential whose magnitude depends upon the amplitude of the pulse, its time duration, and the anode resistance of the diode. During the intervals between pulses, capacitor 53 will discharge slowly through resistor 52. However, the time constant of the combination is chosen short enough that capacitance 53 always discharges completely even during the shortest period occurring between pulses. Since the pulses have all the same amplitude and the same wave form, the average voltage developed across resistor 52 will be proportional to the area above the zero axis, and hence to the number of pulses occurring during a given time interval. The filter comprising resistor 54 and capacitor 55 permits only the direct voltage component to be applied to output potentiometer 62. Accordingly, the voltage developed across the potentiometer will be a negative bias whose amplitude is directly proportional to the repetition rate of the pulses from the pulse generator, and consequently proportional to the repetition rate of the wave form of the voltage applied to the input 10. This is illustrated by curve 83 of Fig. 3.

The amplitude control circuit 60 comprises a triode valve 61 whose cathode is grounded and whose anode is connected to the junctions of resistors 44 and 45 of the sawtooth generator. The grid of valve 61 is connected to the movable tap on potentiometer 62, and accordingly has applied to it a certain portion of the bias voltage illustrated by curve 83. The current through valve 61 will then vary proportionally, and the potential at the junction of resistors 44 and 45 will vary in an inverse fashion, as illustrated by curve 84 of Fig. 3. As a result, when the repetition rate of the pulse increases, the charging voltage applied to capacitor 46 in series with resistor 45 will increase so that the rate of charge increases. By properly adjusting the tap on potentiometer 62, it is possible to regulate the operation of the amplitude control so that the amplitude of the sawtooth output wave is maintained constant, as illustrated by curve 85. It will also be apparent to those skilled in the art that it is likewise possible to control the amplitude in any other desired manner as a function of the repetition rate.

While the circuit as described will fulfill all the requirements as set out in the objects of this invention, I have found it expedient to incorporate a compensating circuit 70. This circuit comprises a triode valve 71 provided with a cathode resistor 74 and a capacitor 73 coupling the output of the cathode to the junction of resistors 44 and 45 of the sawtooth generator. The anode of the valve is provided with operating potential indicated by B+, and the grid is conductively connected to the junction of capacitor 46 and resistor 45. As is well known in the art, with a cathode coupled circuit of this type, the potential at the cathode varies almost identically to that applied to the grid. Accordingly, when a sawtooth wave is applied to the grid, a similar voltage is developed across the cathode resistor and is coupled back into the charging circuit through capacitor 73. This maintains the potential drop across resistor 45 practically constant and tends to insure a constant rate of charge of capacitor 46, notwithstanding the magnitude of the charge already developed across it. Were it not for the compensating circuit, when the operating voltage is not high enough, or when the capacitor 46 is allowed to charge to a considerable proportion of the charged potential, the ascending portion of the sawtooth waves would deviate from a straight line and approach an exponential curve. With the compensating circuit, it is possible to operate on much lower charging voltages and yet maintain the ascending portion of the sawtooth wave substantially linear.

By way of illustration only, and not by way of limiting this application thereto, the following values of the more critical components were found to provide efficient operation in a construction of my invention.

| Resistor | Ohms | Capacitor | Microfarads | Valves | Type |
|---|---|---|---|---|---|
| 44 | 1,000,000 | 46 | 0.01 | 21 | ½6SL7 |
| 45 | 1,000,000 | 73 | 1 | 31 | ½6SL7 |
| 52 | 68,000 | 53 | 0.0015 | 41 | ½6SN7 |
| 54 | 1,000,000 | 55 | 1 | 51 | ½6SL7 |
| | | | | 61 | ½6SL7 |
| | | | | 71 | ½6SL7 |

A generator incorporating these circuit elements produced on test a substantially constant sawtooth output. With large variations in frequency the amplitude varied to a certain extent, but the ratio of amplitudes at the output did not exceed 3 to 1 even when the ratio of the frequencies was as high as 30 to 1.

While a specific embodiment has been shown and described, it will, of course, be understood that various modifications may be made without departing from the invention. For example, it is quite apparent to anyone skilled in the art that it is not necessary to use a blocking oscillator for the pulse generator and that it is equally feasible to use a line-controlled discharge circuit, or a gaseous discharge oscillator. In the same manner, other types of sawtooth generators having a triggering input circuit may be substituted for that shown in the embodiment. Likewise, it is possible to substitute other types of counting circuits or compensating amplifiers or to vary the characteristics of the amplitude control circuit 60. Other equivalent circuits may also be utilized for the compensating circuit 70, as will readily occur to those familiar with electronic circuit design. The appended claims are therefore intended to cover any modifications within the true spirit and scope of my invention.

What I claim as new and desire to secure by Letters Patent of the United States is:

1. An electric wave generator comprising a source of electrical oscillations, a pulse generating circuit synchronized by said oscillations for generating a corresponding series of voltage pulses each of short duration relative to the period of one of said oscillations, a sawtooth generator comprising a source of fixed unidirectional potential, a fixed resistance, a capacitance and an electronic valve having a cathode, an anode and a control grid, said resistance and said capacitance being serially connected across said source of potential and said valve being connected across said capacitance, means for applying said pulses to said control grid in such polarity that said valve is recurrently rendered conducting to discharge said capacitance, a counter circuit comprising a rectifying device and a filter to which said pulses are applied for generating a bias voltage proportional to the recurrence rate of said pulses, and means to apply said bias voltage between a point on said resistance and the electrode of said capacitance remote from said resistance whereby the charging rate of said capacitance is made to vary in accordance with said variable frequency.

2. An electric wave generator having an input to which an alternating voltage of variable frequency is applied, a pulse generating circuit synchronized with said voltage for generating, in response to each cycle of said voltage, a pulse of short duration relative to the period of said cycle, a sawtooth generator comprising a source of fixed unidirectional potential, a fixed resistance, a capacitance and an electron valve having a cathode, an anode and a control grid, said resistance and said capacitance being serially connected across said source of potential, and said valve being connected across said capacitance, means for applying said pulses to said control grid in such polarity that said valve is recurrently rendered conducting to discharge said capacitance and immediately thereafter is rendered non-conducting to permit the initiation of the charging of said capacitance from said source, a counter circuit comprising a rectifying device and a filter to which said pulses are applied for generating a bias voltage proportional to the recurrence rate of said pulses, and means to apply said bias voltage between a point on said resistance and the electrode of said capacitance remote from said resistance whereby the charging rate of said capacitor is made to vary in accordance with said variable frequency.

3. A sawtooth generator comprising a source of fixed unidirectional potential having positive and negative output terminals, a fixed resistance, a capacitance and an electron valve having a cathode, an anode and a control grid, said capacitance being serially connected between said positive terminal and through said resistance to the negative terminal of said source, and said valve being connected across said capacitance, means normally biasing said valve to non-conductive condition, means for applying recurrent positive voltage pulses to said control grid, whereby said valve is recurrently rendered conducting to discharge said capacitance and immediately thereafter is rendered non-conducting to permit initiation of charging of said capacitance from said source, a counter circuit comprising a rectifying device and a filter to which said pulses are applied for generating a bias voltage proportional to the recurrence rate of said pulses, and a second electron valve connected across said source of potential through a portion of said resistance and having a control grid to which said bias voltage is applied, said second valve being adjusted to cause the charging current flowing through the remaining portion of said resistance to vary in accordance with the frequency of said alternating voltage so as to maintain the amplitude of the sawtooth voltage across said capacitance substantially constant.

ROBERT E. MOE.

REFERENCES CITED

The following references are of record in the file of this patent:

UNITED STATES PATENTS

| Number | Name | Date |
|---|---|---|
| 2,266,516 | Russell | Dec. 16, 1941 |
| 2,426,256 | Zenor | Aug. 26, 1947 |
| 2,448,069 | Ames, Jr. et al. | Aug. 31, 1948 |
| 2,448,070 | Sunstein | Aug. 31, 1948 |